Figure 1:
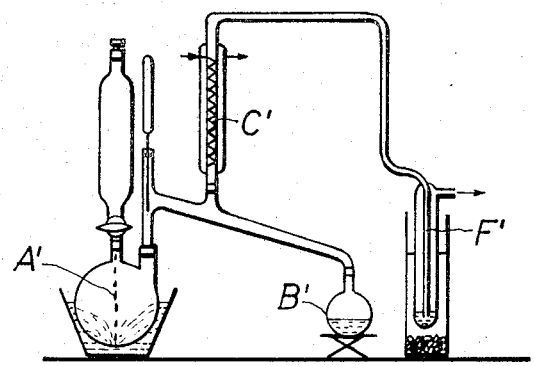

INVENTORS:
HEINRICH PELSTER, ERNST MÜHLBAUER, DETLEF DELFS.

ATTORNEYS

United States Patent Office 3,345,394
Patented Oct. 3, 1967

3,345,394
METHOD OF CLEAVING A THIOCARBAMIC ACID ESTER
Heinrich Pelster, Leverkusen, Ernst Muhlbauer, Cologne-Stammheim, and Detlef Delfs, Opladen, Germany, assignors to Farbenfabriken Bayer Aktiengesellschaft, Leverkusen, Germany, a German corporation
Filed May 6, 1963, Ser. No. 278,149
Claims priority, application Germany, May 15, 1962, F 36,805
4 Claims. (Cl. 260—453)

This invention relates to isocyanates and more specifically to novel isocyanate compositions and their methods of preparation.

There are various methods known for the production of organic isocyanates. In one method, organic amines are phosgenated to prepare the corresponding isocyanate. In a second general method used, N-alkyl carbamic acid phenyl esters are thermally split to form alkyl isocyanates and phenols, the isocyanates then separate from the phenol by distillation or other convenient means. This second process is similar to those described in U.S. Patent 2,409,-712. Said patent discloses a process for preparing alkyl isocyanates by pyrolizing N-alkyl carbamic alkyl esters, obtaining a liquid mixture from an alcohol and an alkyl isocyanate, said liquid mixture has to be separated by distillation. For danger of recombination this distillation is a technically difficult procedure.

A number of various processes are known for the production of organic isocyanates from primary aliphatic or aromatic amines and phosgene. In every case, a large quantity of hydrochloric acid is formed in these reactions. Consequently, it is not possible in this way to produce isocyanates of which the alkyl or aryl radicals contain substituents which react with hydrochloric acid under the reaction conditions. Included among these substituents are the acetal groups, the tertiary amino groups, the ether groups and cyclic ether radicals. In addition, a number of alkyl and aryl isocyanates, the hydrocarbon radicals of which contain one or more ether groups (e.g. 3-methoxypropyl isocyanate and 3-ethoxypropyl isocyanate) are so strongly attacked during the phosgenation that the production thereof and the separation from the chloroalkyl isocyanates which are formed as by-products due to the splitting off of ether is often impossible.

The second possibility above-noted for the production of isocyanates is by the thermal splitting of N-alkylcarbamic acid phenyl esters into alkyl isocyanates and phenol and is employed for the production of methyl isocyanate and ethyl isocyanate. However, this method can only be employed for the production of very readily volatile isocyanates which can be satisfactorily distilled off from the phenol. When attempts were made to produce isocyanates of higher boiling points in this way, the desired isocyanate was not obtained, but resinification and polymerization products thereof resulted.

It is, therefore, an object of this invention to provide a novel process for the manufacture of organic isocyanates which are devoid of the foregoing disadvantages. Another object of this invention is to provide a novel process for the production of organic isocyanates whereby the produced isocyanates can be easily isolated from the remainder of the reaction product. Another object of this invention is to provide a novel process involving the simultaneous preparation of organic isocyanates and organic mercaptans. A still further object of this invention is to provide a process for the production of heretofore unavailable organic isocyanate. Another object of this invention is to provide a process for the production of relatively high boiling organic isocyanates whereby the by-products formed in the same reaction are conveniently removed from the organic isocyanate product. A still further object of this invention is to provide a process for the production of novel organic isocyanates whereby said organic isocyanates are produced in substantially high yields.

The foregoing objects and others which will become apparent from the following description are accomplished in accordance with this invention, generally speaking, by providing a novel process for the production of organic isocyanates which comprises the thermal splitting of a N-alkyl or N-aryl thiocarbamic acid alkyl ester and the subsequent separation of the isocyanate and alkyl mercaptan cleavage products before they recombine to form the initial carbamic acid alkyl ester. The separation of the product isocyanate from the by-product alkyl mercaptan is accomplished at temperatures below the cleavage temperature and before any formation of allophanic acid esters of isocyanurates takes place.

The process of the invention herein disclosed involves the production of an organic isocyanate by (1) heating to a temperature of at least about 100° C. a composition having the general formula

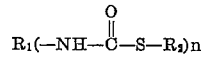

wherein $R_1$ is selected from the group consisting of alkyl, aryl, aralkyl, alkylene, heterocyclic and cycloalkyl radicals, and wherein $R_1$ is substituted by a member selected from the group consisting of hydrogen, dialkylamino, ester, halogen, ether, thioether, acetal and ketal; $R_2$ is a radical selected from the group consisting of methyl, ethyl, propyl, isopropyl, butyl, isobutyl and tertiary butyl; $n$ is an integer having a value of from 1 to 3; (2) thereby obtaining a resulting product containing a liquid and a gaseous phase; (3) and immediately separating said liquid from said gaseous phase at a temperature below about 80° C. This process is not restricted either by the acid sensitivity of certain substituents on the hydrocarbon radical or by the boiling point of the isocyanates which are produced. In the case of monoisocyanates, the reaction takes place in accordance with the following equation:

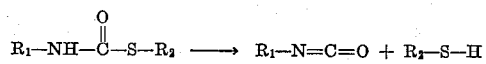

wherein $R_1$ represents an aliphatic or aromatic radical, which may be substituted by one or more alkoxy radicals, cyclic ether radicals, acetal radicals, tertiary amino radicals or other substituents which do not react with the —NCO groups; and $R_2$ represents an alkyl radical, preferably an alkyl radical, the mercapto derivative of which is gaseous at room temperature under reduced pressure.

The present process is based on the fact that the thermal splitting of an N-alkyl or N-aryl thiocarbamic acid alkyl ester is followed by separation of the isocyanate and alkyl mercaptan cleavage products as quickly as possible before they are recombined again to form the N-alkyl or N-aryl thiocarbamic acid alkyl esters at temperatures below the cleavage temperature and before any formation of allophanic acid esters or isocyanurates takes place.

The characterizing feature of the process is the brief heating of an N-alkyl or N-aryl thiocarbamic acid alkyl ester under reduced pressure to about 100 to 600° C., whereafter the cleavage products are immediately cooled to below about 80° C. and the liquid phase is separated from the gaseous phase.

This thermal splitting or cleavage with subsequent rapid separation of the components may be carried out by blowing the reactants in finely divided form through a chamber heated to the cleavage temperature and by quickly cooling the cleavage products which are formed to about —20° C. to about +50° C. in a following condenser, whereby the isocyanate condenses, while the alkyl mercaptan (preferably methyl mercaptan) may be drawn off as a gas.

The temperature is preferably from about 250 to 400° C. and the reduced pressure is preferably about 0.1 to about 100 mm. Hg. The time during which the N-alkyl or N-aryl thiocarbamic acid alkyl esters are subjected to this treatment is measured as seconds or fractions of a second. For example, the alkyl ester is introduced dropwise or sprayed through a nozzle into a heated reaction chamber.

The apparatus shown in FIGURE 1 of the accompanying drawings is suitable when the alkyl ester is introduced dropwise. This apparatus consists of a heated vessel with two necks A', the vessel being provided with a dropping funnel and with a universal distillation bridge. The reflux condenser C' arranged on the distillation bridge is connected to a vacuum pump by way of a trap F' which is cooled with liquid air. The liquid N-alkyl or N-aryl thiocarbamic acid alkyl ester is dripped through the dropping funnel into the vessel A' which is heated to about 100 to 600° C. (preferably to about 250 to 400° C.) and evacuated to about 0.1 to 100 mm. Hg. The N-alkyl or N-aryl thiocarbamic alkyl ester is then split into isocyanate and alkyl mercaptan. The hot vapor mixture consisting of isocyanate and alkyl mercaptan is suddenly cooled on the reflux condenser C', preferably to a temperature of from about −20° C. to about +50° C. The isocyanate thereby condenses and runs into the receiver B' while the alkyl mercaptan (preferably methyl mercaptan) is gaseous under reduced pressure and is continuously extracted by the vacuum pump and condensed in the trap F' which is cooled by means of liquid air.

Figure 2:
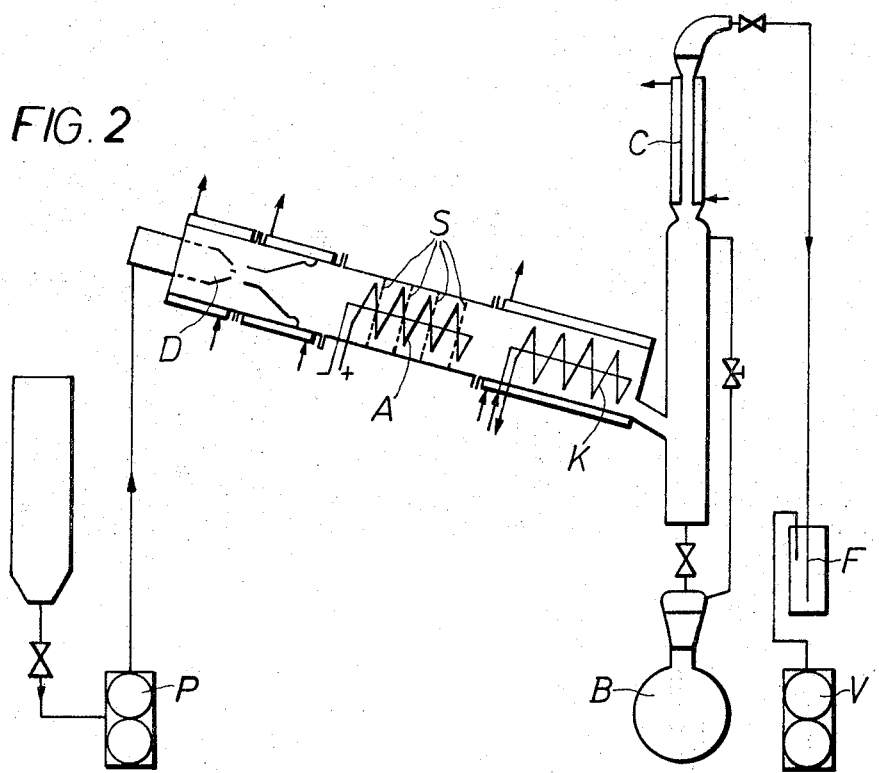

A preferred apparatus for carrying out the process according to the present invention is shown in FIGURE 2 of the accompanying drawings. In this case the N-alkyl or N-aryl thiocarbamic acid alkyl ester is sprayed by means of a metering pump P through a nozzle D as a fine mist into a reaction chamber A which is heated to a temperature of from about 100 to 600° C. and preferably to a temperature of from about 250 to 350° C. and which is evacuated to about 0.1 to 100 mm. Hg. By this means, a very large surface is obtained so that the splitting occurs instantaneously. A number of N-alkyl or N-aryl thiocarbamic acid alkyl esters are liquids or low boiling compounds at room temperature and can be injected in the form of melts. N-alkyl or N-aryl thiocarbamic acid alkyl esters of higher melting point may be injected as a solution in an inert organic solvent such as trichlorobenzene or paraffin oil.

The reaction chamber A consists of a cylindrical steel tube having a diameter of about 70 mm. and a length of about 500 mm. and as shown in FIGURE 2, is provided with a coil of steel tubing internally, which can be electrically heated. The cylindrical tube is subdivided by means of several discs S provided with apertures. Following the heated reaction chamber is a condenser K of like dimensions, which is provided with a cooling coil and a jacket cooling system and can be cooled with brine or water. In this condenser, the hot isocyanate and alkyl mercaptan vapors (preferably methyl mercaptan) issuing from the reaction chamber are suddenly cooled, preferably to a temperature of from about −20° C. to about +50° C. The isocyanate is thereby condensed and runs into the receiver B. The alkyl mercaptan (preferably methyl mercaptan) is continuously pumped by a vacuum pump V through the second condenser C and may be condensed either in a cooling trap F or be compressed and stored in a pressure container.

The second condenser C prevents small quantities of isocyanate being entrained by the stream of mercaptan. The chosen arrangement has a minimum capacity of about 100 parts of isocyanate per hour, but substantially larger quantities per hour may be passed through the apparatus if desired.

The isocyanate thus obtained may, if desired, be separated from impurities of higher boiling point by simple vacuum distillation, for example, in a liquid film evaporator, and thus be obtained in pure form. The yields of pure isocyanate are between about 30 and about 80% of the theoretical, depending on the nature of the N-alkyl or N-aryl thiocarbamic acid alkyl esters which are split.

Typical N-substituted thiocarbamic acid alkyl esters which are used as the starting material of the process of this invention and their process of manufacture, are given in German Patent 1,171,421. Suitable N-mono-substituted thiocarbamic acid-S-ester starting materials are those of the general formula

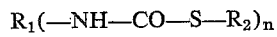

wherein $n$ is 1, 2, 3 or more; and $R_1$ is an alkyl, aryl, aralkyl, alkylene, heterocyclic or cycloalkyl radical, substituted by one or more functional groups, for example, by dialkylamino, ester, halogen, ether, thioether, acetal or ketal groups. $R_1$ may, as above noted, also be a heterocyclic radical, such as furyl, pyridyl or thiophenyl groups. $R_2$ represents a methyl, ethyl, propyl, isopropyl, butyl, isobutyl or tertiary butyl radical.

The following starting materials are particularly preferred:

N-butyl thiocarbamic acid-S-methyl ester
N-naphthyl thiocarbamic acid-S-methyl ester
N-phenyl thiocarbamic acid-S-methyl ester
N-tolyl thiocarbamic acid-S-methyl ester
N-cyclohexyl thiocarbamic acid-S-methyl ester
N-benzyl thiocarbamic acid-S-methyl ester
N-allyl thiocarbamic acid-S-methyl ester
N-methoxypropyl thiocarbamic acid-S-ethyl ester
N-[3-(2-ethylhexoxy)-propyl]-thiocarbamic acid-S-ethyl ester
N-[1-diethylamino isopentyl-(4)]-thiocarbamic acid-S-methyl ester
N-[1-diethylaminopropyl-(3)]-thiocarbamic acid-S-methyl ester
N-[1-dimethylaminopropyl-(3)]-thiocarbamic acid-S-methyl ester
N-[2,5,8-trioxa-undecyl-(11)]-thiocarbamic acid-S-butyl ester
N-[1-ethylmercapto-propyl-(3)]-thiocarbamic acid-methyl ester
N-[3(3'-methoxy)-butoxy-propyl]-thiocarbamic acid-propyl ester
N-[3-ethoxypropyl]-thiocarbamic acid-S-isopropyl ester
N-[3-tetrahydrofurfuryl-propylether-1]-thiocarbamic acid-S-methyl ester
N-[1,1-diethoxyethyl-(2)]-thiocarbamic acid-S-methyl ester
N-[-(2',2'-dimethyl-1',3'-dioxolanyl-(4'))-2-oxapentyl-(5)]-thiocarbamic acid-S-methyl ester
N-furfuryl-thiocarbamic acid-S-methyl ester
N-octadecyl-thiocarbamic acid-S-methyl ester
N-(carbethoxy-ethyl)-thiocarbamic acid-S-methyl ester
propylene-bis-thiocarbamic acid-S-methyl ester
decamethylene-4,9-dioxa,1,12-bis-thiocarbamic acid methyl ester Advantages of the process according to the present invention are (1) a wide range of possible uses is available, since also isocyanates containing acid-sensitive substituents may be prepared in this way; and (2) by comparison with other processes concerned with thermal splitting (for example, of N-alkyl carbamic acid phenyl esters), an immediate and complete separation of the cleavage products can be obtained, since usually it is only a liquid (isocyanate) which has to be separated from a gas (mercaptan, for example, methyl mercaptan). An additional advantage is that the process is carried out continuously and a high yield per unit volume and time is obtained.

The following examples will more specifically define the particulars of the present invention. Parts are by weight unless otherwise specified.

Example 1

The flask A' shown in FIGURE 1 is heated by a metal bath to about 330° C. and the upper end of the reflux condenser C is connected by way of a trap F' cooled with liquid air to a vacuum pump and evacuated to about 15 to 20 mm. Hg. About 109 parts of 3-tetrahydrofurfuryl-propylether-1-thiocarbamic acid-S-methyl ester are then introduced into the heated flask dropwise over a period of about 2½ hours through the dropping funnel. The substance splits into 3-tetrahydrofurfuryl propylether-1-isocyanate

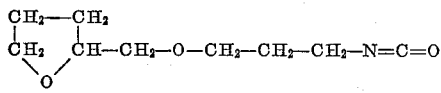

and methyl mercaptan. The isocyanate is condensed by the reflux condenser and runs into the receiver. About 73 parts of impure 3-tetrahydrofurfuryl propylether-1-isocyanate are obtained, from which about 34 parts of the isocyanate in analytically pure form can be obtained in the form of a colorless liquid by vacuum distillation at about 132 to about 135° C./15 mm. This corresponds to a yield of about 40% of the theoretical. The methyl mercaptan is extracted by the vacuum pump through the reflux condenser and is condensed in the cooling trap.

Example 2

A steel tube having a diameter of about 70 mm. and a length of about 500 mm., provided with a Bosch-nozzle and heated by a heating coil to about 300° C. and comprising a coil-type condenser of the same dimensions cooled by brine to about −20° C. to −10° C. and having a connected receiver, a second condenser, a cooling trap with liquid air and a vacuum pump (as shown in FIGURE 2) is evacuated to about 8 to 10 mm. Hg. About 446 parts of N-3-(2-ethyl-hexoxy)-propyl thiocarbamic acid-S-methyl ester are then injected with a Bosch-metering pump through the Bosch-nozzle over a period of about 3 to 4 hours and the vacuum is maintained at about 8 to 10 mm. About 361 parts of impure 3-(2-ethyl-hexoxy)-propyl isocyanate

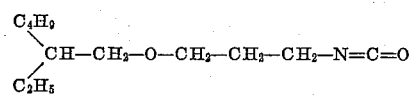

are collected in the receiver and about 50 parts methyl mercaptan are collected in the cooling trap which is cooled with liquid air. About 170 parts of analytically pure compound can be recovered from the crude isocyanate by vacuum distillation at about 100 to 103° C./0.3 mm. The distillation residue is once again split thermally under the same conditions and after distillation, another about 90 parts of 3-(2-ethyl-hexoxy)-propyl isocyanate are obtained. Therefore, a total of about 260 parts of pure 3-(2-ethyl-hexoxy)-propyl isocyanate are obtained as a colorless liquid, corresponding to a yield of about 72% of the theoretical.

Example 3

The procedure is analogous to that of Example 1. About 32 parts of decamethylene-4,9-dioxa-1,12-dithiocarbamic acid-S-methyl ester are thermally split at about 370° C. and about 2 mm. Hg. About 11 parts of decamethylene-4,9-dioxa-1,12-diisocyanate are thus obtained.

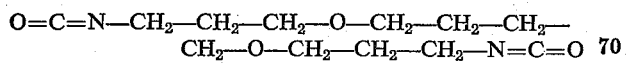

It is possible to obtain about 7.2 parts of the compound in analytically pure form as a colorless liquid by vacuum distillation at about 141 to 144° C./2 mm. The yield is 31% of the theoretical.

Example 4

The procedure is analogous to that of Example 1. About 280 parts of β-phenylethyl-thiocarbamic acid-S-methyl ester (melting point about 55 to 57°) are introduced under reduced pressure (about 70 mm. Hg) through a dropping funnel heated with steam and in liquid form into the decomposition flask which is heated to about 330 to 340° C.

About 220 parts of not entirely pure isocyanate are collected in the receiver from which it is possible by vacuum distillation at about 104 to 106° C./15 mm., to obtain about 147 parts of pure β-phenylethyl isocyanate as a colorless liquid. The yield is about 70% of the theoretical.

Example 5

About 300 parts of 3-(3'-methoxy)-butoxy-propyl-1-thiocarbamic acid-S-methyl ester were injected according to Example 2 and thermally split at about 300° C./8 mm. After two splitting operations with vacuum distillation, there are obtained about 170 parts of 3-(3'-methoxy)-butoxy-propyl-isocyanate

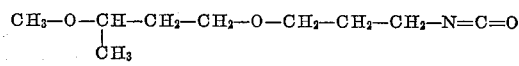

in the form of a colorless liquid having a boiling point of about 115 to 117° C./15 mm. in pure form. The yield is about 71% of the theoretical.

Example 6

About 25 parts of N-butyl-thiocarbamic acid-S-methyl ester are introduced dropwise in the form of a melt, (melting point about 35° C.) in a manner analogous to Example 1 into the decomposition flask which is heated to about 250 to 270° C. and evacuated to about 60 mm. After repeated splitting and subsequent distillation, about 5.1 parts of n-butyl isocyanate, boiling point about 45 to 50° C./60 mm. are obtained. The yield is about 30% of the theoretical.

Example 7

The procedure is analogous to that of Example 6. About 40 parts of N-3-ethoxypropyl-thiocarbamic acid-S-methyl ester are thermally split at about 340° C./20 mm. After distillation, about 12 parts of 3-ethoxy-propyl isocyanate are obtained as a colorless liquid having a boiling point of about 57 to 58° C./15 mm. The yield is about 41% of the theoretical.

Example 8

As described in Example 2, about 100 parts of 1-diethylamino isopentyl-(4)-thiocarbamic acid-S-methyl ester are injected under vacuum (about 7 mm. Hg) and thermally split at about 350° C. Since the splitting is still not complete with a single passage, the isocyanate-containing reaction product which has formed is introduced twice more into the decomposition apparatus. There are thus obtained about 55 parts of 1-diethylamino-isopentyl-(4)-isocyanate which is still not completely pure. By vacuum distillation, about 20 parts of the compound are obtained in analytically pure form corresponding to a yield of about 23.9% of the theoretical.

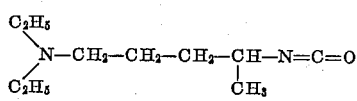

Example 9

In a manner analogous to Example 1, about 30 parts of 1-dimethyl-aminopropyl-3-thiocarbamic acid-S-methyl ester are thermally split at about 360° C. and a vacuum of about 18 mm. Hg. By distillation of the crude cleavage product under vacuum, about 4.5 parts of pure 1-dimethyl-aminopropyl-3-isocyanate having a boiling point of about 80° C./31 mm. Hg are obtained. The yield being about 20.5% of the theoretical.

$$\begin{array}{c}CH_3\\ \phantom{CH_3}\diagdown\\ \phantom{CH_3}\phantom{\diagdown}N-CH_2-CH_2-CH_2-N=C=O\\ \phantom{CH_3}\diagup\\ CH_3\end{array}$$

Example 10

The procedure is as described in Example 1, about 35 parts of 1-methoxy-propyl-3-thiocarbamic acid-S-methyl ester are slowly introduced dropwise at about 300° C. into the decomposition apparatus which is under a vacuum of about 190 to 200 mm. Hg. After repeated splitting and subsequent vacuum distillation, a total of about 17 parts of 1-methoxypropyl-3-isocyanate are obtained in pure form. The product has a boiling point of about 102° C./186 mm. Hg and the yield is about 65% of the theoretical.

$$CH_3-O-CH_2-CH_2-CH_2-N=C=O$$

Example 11

About 125 parts of 2,5,8-trioxaundecyl-11-thiocarbamic acid-S-methyl ester are slowly introduced dropwise and thermally split at about 360° C.13 mm. Hg, as described in Example 1. Under these conditions, about 88 parts of crude split product are obtained from which about 67 parts of pure 2,5,8-trioxaundercyl-11-isocyanate can be obtained by fractional distillation at about 140 to 141° C./14 mm. Hg. The yield is about 66% of the theoretical.

$$CH_3-O-(CH_2-CH_2-O)_2-\\ CH_2-CH_2-CH_2-N=C=O$$

Example 12

In the decomposition apparatus employed in Example 2, about 87 parts of 2,5,8,11-tetraoxatetradecyl-14-thiocarbamic acid-S-methyl ester are thermally split at about 350° C. under vacuum (about 7 to 8 mm. Hg) by being sprayed in twice. Subsequent fractional distillation produces about 37 parts of pure 2,5,8,11-tetraoxatetradecyl-14-isocyanate, starting from about 78 parts of crude products. The yield is about 50.8% of the theoretical.

$$CH_3-O-(CH_2-CH_2-O)_3-\\ CH_2-CH_2-CH_2-N=C=O$$

Example 13

About 42 parts of 1-ethylmercaptopropyl-3-thiocarbamic acid-S-methyl ester are slowly introduced dropwise at about 350° C. under reduced pressure (about 15 mm. Hg) as described in Example 1 into the splitting apparatus described therein. The resulting crude product which is slightly brownish in color, produces after fractional distillation about 12.5 parts of pure 1-ethylmercaptopropyl-3-isocyanate in the form of a colorless liquid having a boiling point of about 112 to 114° C./29 mm. Hg. The yield is about 39.5% of the theoretical.

$$C_2H_5-S-CH_2-CH_2-CH_2-N=C=O$$

Example 14

The procedure is as described in Example 1. About 55 parts of 1,1-diethoxyethyl-2-thiocarbamic acid-S-methyl ester are split at a tmperature of about 340° C. and a vacuum of from about 12 to 15 mm. Hg. From the crude isocyanate thus obtained, it is possible by fractional distillation in vacuo to isolate about 17 parts of pure 1,1-diethoxyethyl-2-isocyanate having a boiling point of about 83° C./30 mm. Hg. The yield is about 40% of the theoretical.

$$\begin{array}{c}C_2H_5O\\ \phantom{C_2H_5O}\diagdown\\ \phantom{C_2H_5O}\phantom{\diagdown}CH-CH_2-N=C=O\\ \phantom{C_2H_5O}\diagup\\ C_2H_5O\end{array}$$

Example 15

The proceduring is as described in Example 2, about 200 parts of 1-(2',2'-dimethyl-1',3'-dioxolanyl-(4'))-2-oxapentyl-5-thiocarbamic-acid-S-methyl ester are sprayed twice at about 350° C. and under a vacuum of from about 5 to 7 mm. Hg into the decomposition tube and thermally split. By subsequent fractional distillation under vacuum of the resulting crude isocyanate, there are obtained about 68 parts of pure 1-(2,2'-dimethyl-1',3'-dioxolanyl-(4'))-2-oxapentyl-5-isocyanate having a boiling point of about 130 to 132° C./10 mm. Hg. The residue is once again split under the same conditions and yields another about 19 parts of the pure product. A total of about 87 parts of colorless isocyanate are obtained. The yield is about 49.5% of the theoretical.

$$\begin{array}{c}CH_2-O\phantom{xx}CH_3\\ |\phantom{xxxx}\diagdown\phantom{x}\diagup\\ \phantom{xxx}C\\ CH-O\phantom{x}\diagup\phantom{x}\diagdown CH_3\\ |\\ CH_2-O-CH_2-CH_2-CH_2-N=C=O\end{array}$$

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:
1. A method of cleaving a thiocarbamic acid ester having the formula

$$R_1(-NH-\overset{\overset{\displaystyle O}{\|}}{C}-S-R_2)_n$$

wherein $R_1$ is an alkyl, aryl, aralkyl, alkylene, a furfuryl or cycloalkyl radical, $R_2$ is a lower alkyl radical and $n$ is 1 to 3 and is equal to the number of free valences of $R_1$, and separating the resulting organic isocyanate and mercaptan which comprises heating said thiocarbamic acid ester to a temperature of about 100 to 600° C. under reduced pressure to cleave said thiocarbamic acid ester into the corresponding isocyanate having the formula $R_1(-N=C=)_n$ and mercaptan having the formula $R_2(-S-H)_n$, immediately cooling said iocyanate and mercaptan to a temperature below about 80° C. to form a liquid isocyanate and a gaseous mercaptan and withdrawing the gaseous mercaptan from the liquid isocyanate.

2. The method of claim 1 wherein $R_1$ is tetrahydrofurfuryl and $R_2$ is methyl.

3. The method of claim 1 wherein said reduced pressure is in the range of from about 0.1 to about 10 mm. Hg.

4. The method of claim 1 wherein said thiocarbamic acid ester is heated to a temperature of from about 250 to about 400° C.

References Cited

UNITED STATES PATENTS

| | | | |
|---|---|---|---|
| 2,409,712 | 10/1946 | Schweitzer | 260—253 |
| 2,733,261 | 1/1956 | Seeger et al. | 260—453 X |
| 2,764,592 | 9/1956 | Seeger et al. | 260—453 X |

OTHER REFERENCES

Frey, College Chemistry, 1958, 2nd Edition, Prentice-Hall, Inc., Englewood Cliffs, N.J., pp. 304–313; L.C. Cat. Card No. 58–9186.

CHARLES B. PARKER, *Primary Examiner.*

D. R. MAHANAND, D. H. TORRENCE,

*Assistant Examiners.*